(12) United States Patent
Nomura et al.

(10) Patent No.: US 12,073,311 B2
(45) Date of Patent: Aug. 27, 2024

(54) SYNAPTIC CIRCUIT AND NEURAL NETWORK APPARATUS

(71) Applicant: KABUSHIKI KAISHA TOSHIBA, Minato-ku (JP)

(72) Inventors: Kumiko Nomura, Shinagawa (JP); Takao Marukame, Chuo (JP); Yoshifumi Nishi, Yokohama (JP); Koichi Mizushima, Kamakura (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1035 days.

(21) Appl. No.: 17/005,731

(22) Filed: Aug. 28, 2020

(65) Prior Publication Data

US 2021/0279558 A1    Sep. 9, 2021

(30) Foreign Application Priority Data

Mar. 6, 2020  (JP) .................................. 2020-038543

(51) Int. Cl.
  *G06N 3/063*   (2023.01)
  *G06N 3/049*   (2023.01)

(52) U.S. Cl.
  CPC .............. *G06N 3/063* (2013.01); *G06N 3/049* (2013.01)

(58) Field of Classification Search
  CPC ........ G06N 3/063; G06N 3/065; G06N 3/088; G06N 3/049
  See application file for complete search history.

(56) References Cited

U.S. PATENT DOCUMENTS 8,655,813 B2    2/2014   Ananthanarayanan et al.
11,176,451 B2 *  11/2021  Li ............................ G11C 11/24
(Continued)

FOREIGN PATENT DOCUMENTS

EP             357016 B1 *  4/1999  ............... G06N 3/04

OTHER PUBLICATIONS

Soures, N. et al., "On-Device STDP and Synaptic Normalization for Neuromemristive Spiking Neural Network," 2017 IEEE 60th International Midwest Symposium on Circuits and Systems (MWSCAS), Aug. 2017, 4 pages.

(Continued)

*Primary Examiner* — Ryan C Vaughn
(74) *Attorney, Agent, or Firm* — Oblon, McClelland, Maier & Neustadt, L.L.P.

(57) ABSTRACT

A synaptic circuit according to an embodiment includes: a weight current circuit that applies a weight current corresponding to a weight value; an input switch that switches whether or not to cause the weight current circuit to apply the weight current; a capacitor that includes a first terminal and a second terminal, the first terminal being given a constant voltage; an output circuit that outputs the output signal corresponding to a capacitor voltage; a charge adjustment circuit that decreases or increases charges accumulated in the capacitor by drawing, from the second terminal, a capacitor current corresponding to a current value of the weight current, or supplying the capacitor current to the second terminal; and a control circuit that switches whether or not to reduce a current having a predetermined current value from the capacitor current in accordance with the weight value.

15 Claims, 11 Drawing Sheets

(56) References Cited

U.S. PATENT DOCUMENTS

| | | | | |
|---|---|---|---|---|
| 2002/0030205 A1* | 3/2002 | Varshavsky | ............ | G06N 3/063 |
| | | | | 257/E27.06 |
| 2015/0269483 A1* | 9/2015 | Nishitani | ............... | G06N 3/065 |
| | | | | 706/25 |
| 2015/0278682 A1* | 10/2015 | Saxena | .............. | G11C 13/0007 |
| | | | | 365/45 |
| 2019/0279078 A1* | 9/2019 | Cambou | ................ | G06N 3/065 |

OTHER PUBLICATIONS

Chicca, E. et al., "Neuromorphic Electronic Circuits for Building Autonomous Cognitive Systems," Proceedings of the IEEE, vol. 102, No. 9, Sep. 2014, 22 pages.

* cited by examiner

SYNAPTIC CIRCUIT AND NEURAL NETWORK APPARATUS

CROSS-REFERENCE TO RELATED APPLICATIONS

This application is based upon and claims the benefit of priority from Japanese Patent Application No. 2020-038543, filed on Mar. 6, 2020, the entire contents of which are incorporated herein by reference.

FIELD

Embodiments described herein relate generally to a synaptic circuit and a neural network apparatus.

BACKGROUND

In recent years, a technology that includes a neuromorphic processor by using a hardware-based neural network has been proposed. Such a neuromorphic processor includes a synaptic circuit. In the synaptic circuit, a weight value representing a weight is set, and a signal in which the influence of the weight value is added to the signal received from a pre-synaptic neuron is given to a post-synaptic neuron.

The weight value set in the synaptic circuit is updated in accordance with a predetermined learning method. As a learning method for a neuromorphic processor, learning using spike timing dependent synaptic plasticity (STDP) is known.

It has been pointed out that, when the weight value is updated by the STDP learning, the weight value becomes so large that the neuron is likely to fire, thereby making it impossible to perform an appropriate inference. In order to solve this problem, it has been proposed to perform normalization processing. In the conventional normalization processing, the sum of a plurality of weight values set in a plurality of synaptic circuits connected to the input stage of one neuron is adjusted to be equal to or less than a constant value. This makes it possible to uniformly reduce the plurality of weight values that have become too large and to appropriately fire the neuron. However, this method requires execution of reading a plurality of weight values, executing an operation, and setting a plurality of weight values again, which has resulted in an increase in circuit cost. However, this method requires execution of processing of reading a plurality of weight values, executing an operation, and setting a plurality of weight values again, which has resulted in an increase in the circuit cost.

DETAILED DESCRIPTION

A synaptic circuit according to an embodiment includes a circuit in which a weight value is set, and a circuit receiving a binary input signal from a pre-synaptic neuron circuit and outputting an output signal to a post-synaptic neuron circuit. The synaptic circuit includes: a weight current circuit, an input switch, a capacitor, an output circuit, a charge adjustment circuit, and a control circuit. The weight current circuit applies a weight current having a current value corresponding to the weight value. The input switch switches, in response to the input signal, whether or not to cause the weight current circuit to apply the weight current. The capacitor includes a first terminal and a second terminal, the first terminal being given a constant voltage. The output circuit that outputs the output signal corresponding to a capacitor voltage generated at the second terminal. The charge adjustment circuit, when the weight current is applied through the input switch, decreases or increases charges accumulated in the capacitor by drawing, from the second terminal, a capacitor current corresponding to a current value of the weight current, or supplying the capacitor current to the second terminal. The control circuit that switches whether or not to reduce a current having a predetermined current value from the capacitor current in accordance with the weight value.

Hereinafter, a neural network apparatus 10 according to an embodiment will be described with reference to the drawings. The neural network apparatus 10 according to the embodiment is implemented by hardware and can execute accurate inference.

Figure 1:
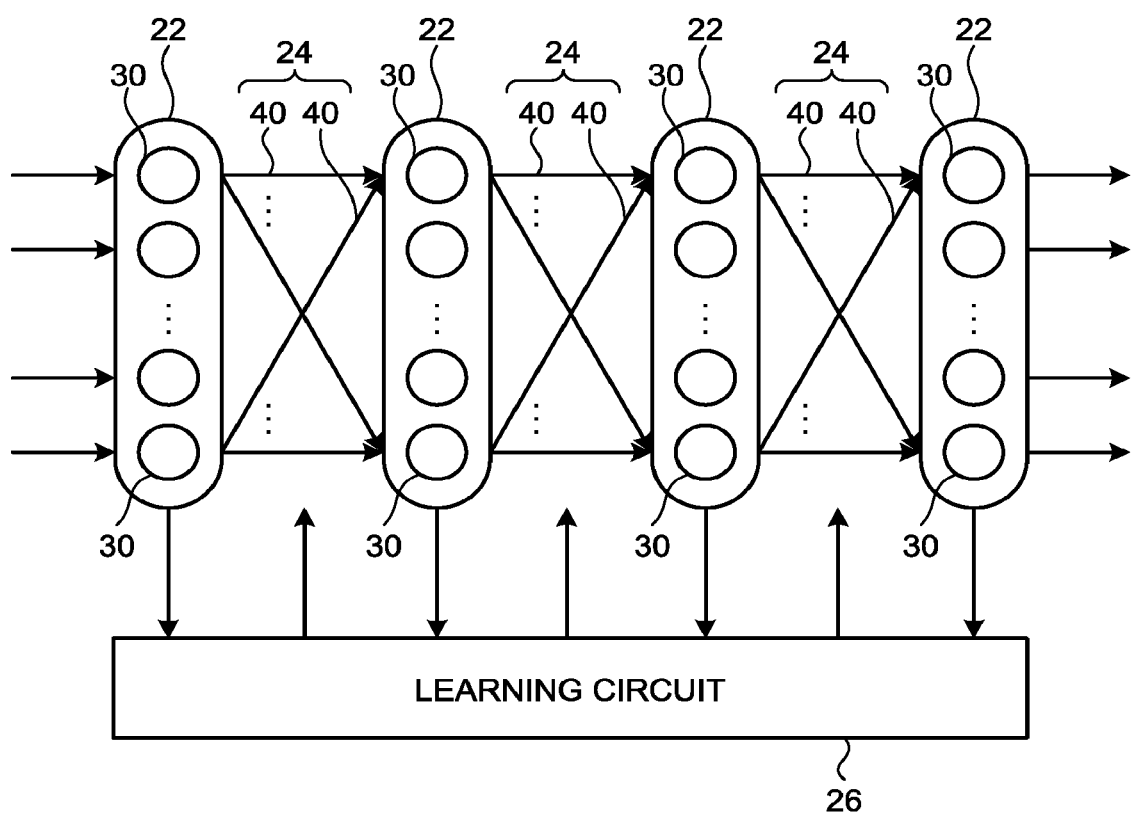
FIG. 1 is a configuration diagram of a neural network apparatus according to an embodiment.

FIG. 1 is a diagram illustrating the configuration of the neural network apparatus 10 according to the embodiment. The neural network apparatus 10 includes an N-stage (N is an integer equal to or greater than 2) layers 22, (N−1) synapses 24, and a learning circuit 26.

Each of the N-stage layers 22 includes a plurality of neuron circuits 30. Each of the plurality of neuron circuits 30 acquires a plurality of signals having been output from the pre-synaptic layer 22, and executes product-sum operation processing on the plurality of signals having been acquired. The first-stage layer 22 of the N-stage layers 22 acquires a plurality of signals from an external device or an input layer. Then, each of the plurality of neuron circuits 30 outputs a signal in which activation function processing is performed on a signal representing the product-sum operation result. Each of the plurality of neuron circuits 30 executes the product-sum operation processing and the activation function processing by an analog circuit, for example.

Each of the (N−1) synapses 24 includes a plurality of synaptic circuits 40. Each of the plurality of synaptic circuits 40 has a weight value set by the learning circuit 26.

The n-th (n is an integer equal to or greater than 1 and equal to or less than (N−1)) synapse 24 of the (N−1) synapses 24 is disposed between the n-th layer 22 and the (n+1)-th layer 22.

Each of the plurality of synaptic circuits 40 included in the n-th synapse 24 receives, as a binary input signal, a signal having been output from one neuron circuit 30 of the plurality of neuron circuits 30 included in the n-th layer 22. Each of the plurality of synaptic circuits 40 included in the n-th synapse 24 generates an output signal in which the influence of the set weight value is added to the received input signal. In the present embodiment, the output signal is a binary voltage signal. Alternatively, the output signal may be a current represented by an analog value (continuous value) or a voltage represented by an analog value (continuous value). Then, each of the plurality of synaptic circuits 40 included in the n-th synapse 24 gives an output signal to one neuron circuit 30 of the plurality of neuron circuits 30 included in the (n+1)-th layer 22.

The learning circuit 26 updates a weight value having been set in each of the plurality of synaptic circuits 40. The learning circuit 26 updates, by spike timing dependent synaptic plasticity (STDP) learning, the weight value having been set in each of the plurality of synaptic circuits 40.

In such a neural network apparatus 10, the first-stage layer 22 receives one or a plurality of signals from an external device or an input layer. Then, the neural network apparatus 10 outputs, from the N-th layer 22, one or a plurality of signals representing the result of executing a calculation by the neural network with respect to the one or the plurality of signals having been received.

Figure 2:
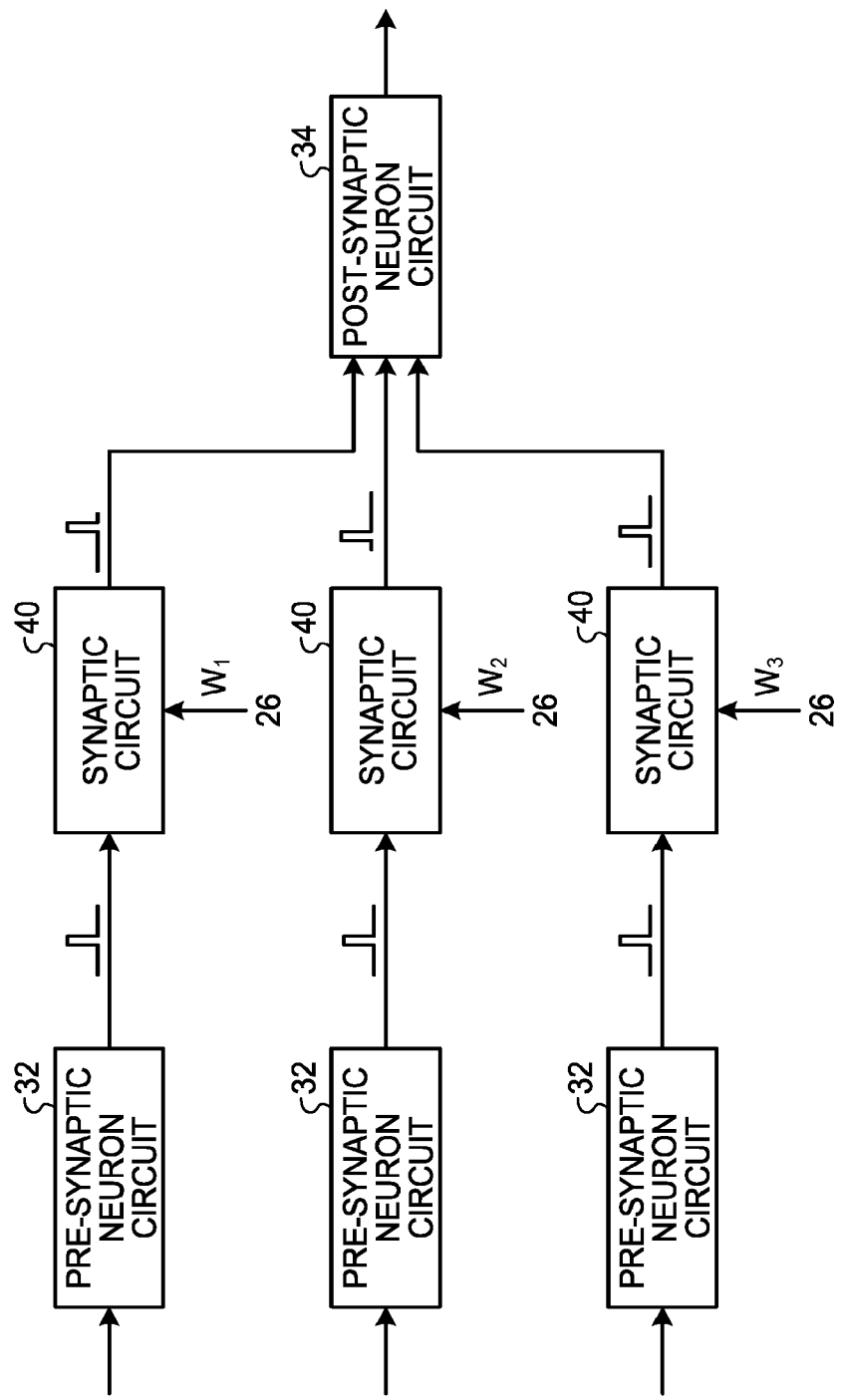
FIG. 2 is a diagram illustrating a connection relation among a plurality of synaptic circuits.

FIG. 2 is a diagram illustrating the connection relation among the plurality of synaptic circuits 40. In the synaptic circuit 40, the weight value is set by the learning circuit 26.

The synaptic circuit 40 receives a binary input signal from a pre-synaptic neuron circuit 32 which is any of the neuron circuits 30 included in the pre-synaptic layer 22. The synaptic circuit 40 outputs an output signal in which the influence of the weight value having been set is added to the binary input signal having been received. For example, the three synaptic circuits 40 illustrated in FIG. 2 each have a weight value ($W_1$; $W_2$; $W_3$) set by the learning circuit 26.

In the present embodiment, the synaptic circuit 40 outputs a binary output signal obtained by delaying a binary input signal by a time corresponding to the set weight value. In other words, in the present embodiment, the synaptic circuit 40 outputs an output signal that causes the firing timing of the pre-synaptic neuron circuit 32 to delay by a time corresponding to the set weight value. For example, as the set weight value is larger, the synaptic circuit 40 shortens the delay time. Then, the synaptic circuit 40 gives the output signal to a corresponding post-synaptic neuron circuit 34.

It is to be noted that, when the input signal fires, the synaptic circuit 40 may output an output signal that is a current having a current amount corresponding to the set weight value. In addition, the synaptic circuit 40 may output an output signal that is a current having a current amount corresponding to a value obtained by multiplying the firing time or the number of firing times of the input signal by the set weight value. In this case, as the set weight value is larger, the synaptic circuit 40 increases the current amount of the output signal. In this case, the post-synaptic neuron circuit 34 receives an output signal represented by an analog value (continuous value) from the synaptic circuit 40. Similarly, the synaptic circuit 40 may also output an output signal represented by a voltage value instead of the current value.

Figure 3:
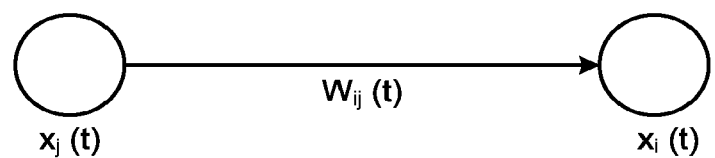
FIG. 3 is a diagram for explaining processing by a learning circuit.

FIG. 3 is a diagram for explaining the processing by the learning circuit 26. The learning circuit 26 updates a weight value having been set in each of the plurality of synaptic circuits 40. The learning circuit 26 updates, by spike timing dependent synaptic plasticity (STDP) learning, the weight value having been set in each of the plurality of synaptic circuits 40.

The learning circuit 26 updates in accordance with Equation (1) the weight value set in a certain synaptic circuit 40 (first synaptic circuit 40-1).

$$W_{ij}(t+\Delta t)=W_{ij}(t)+\Delta W_{ij}(t) \qquad (1)$$

In Equation (1), $\Delta t$ represents a unit time, t represents an arbitrary time, and (t+$\Delta t$) represents the time after the unit time ($\Delta t$) has elapsed from the time (t).

$W_{ij}(t)$ represents the weight value set in the first synaptic circuit 40-1 at the time (t). $W_{ij}(t+\Delta t)$ represents the weight value set in the first synaptic circuit 40-1 at the time (t+$\Delta t$).

Here, $\Delta W_{ij}(t)$ is calculated by Equation (2).

$$\Delta W_{ij}(t)=\eta_{STDP}(x_i(t) \times x_j(t-\Delta t) - x_i(t-\Delta t) \times x_j(t)) \qquad (2)$$

In Equation (2), (t−$\Delta t$) represents the time before the unit time ($\Delta t$) from the time (t), and $\eta_{STDP}$ represents a predetermined constant.

$x_i(t)$ represents the value of the signal that is output from the post-synaptic neuron circuit 34 connected to the first synaptic circuit 40-1 at the time (t). $x_j(t)$ represents the value of the signal that is output from the pre-synaptic neuron circuit 32 connected to the first synaptic circuit 40-1 at the time (t).

$x_i(t-\Delta t)$ represents the value of the signal that is output from the post-synaptic neuron circuit 34 connected to the first synaptic circuit 40-1 at the time (t−$\Delta t$). $x_j(t-\Delta t)$ represents the value of the signal that is output from the pre-synaptic neuron circuit 32 connected to the first synaptic circuit 40-1 at the time (t−$\Delta t$).

It is to be noted that $x_i(t)$, $x_j(t)$, $x_i(t-\Delta t)$, and $x_j(t-\Delta t)$ represent 0 or 1. In addition, $x_i(t)$, $x_j(t)$, $x_i(t-\Delta t)$, and $x_j(t-\Delta t)$ represent firing when they are 1.

$\Delta W_{ij}(t)$ in Equation (2) becomes $\eta_{STDP}$ when the pre-synaptic neuron circuit 32 fires at the time (t−$\Delta t$) and the pre-synaptic neuron circuit 32 fires at the time (t) after the unit time ($\Delta t$), and becomes 0 in other cases.

That is, the learning circuit 26 increases, by a predetermined amount, the weight value set in the synaptic circuit 40 in the case where the signal having been output from the post-synaptic neuron circuit 34 fires, in response to firing of the signal having been output from the pre-synaptic neuron circuit 32. Due to this, the learning circuit 26 can perform STDP learning on the weight values set in each of the plurality of synaptic circuits 40.

Figure 4:
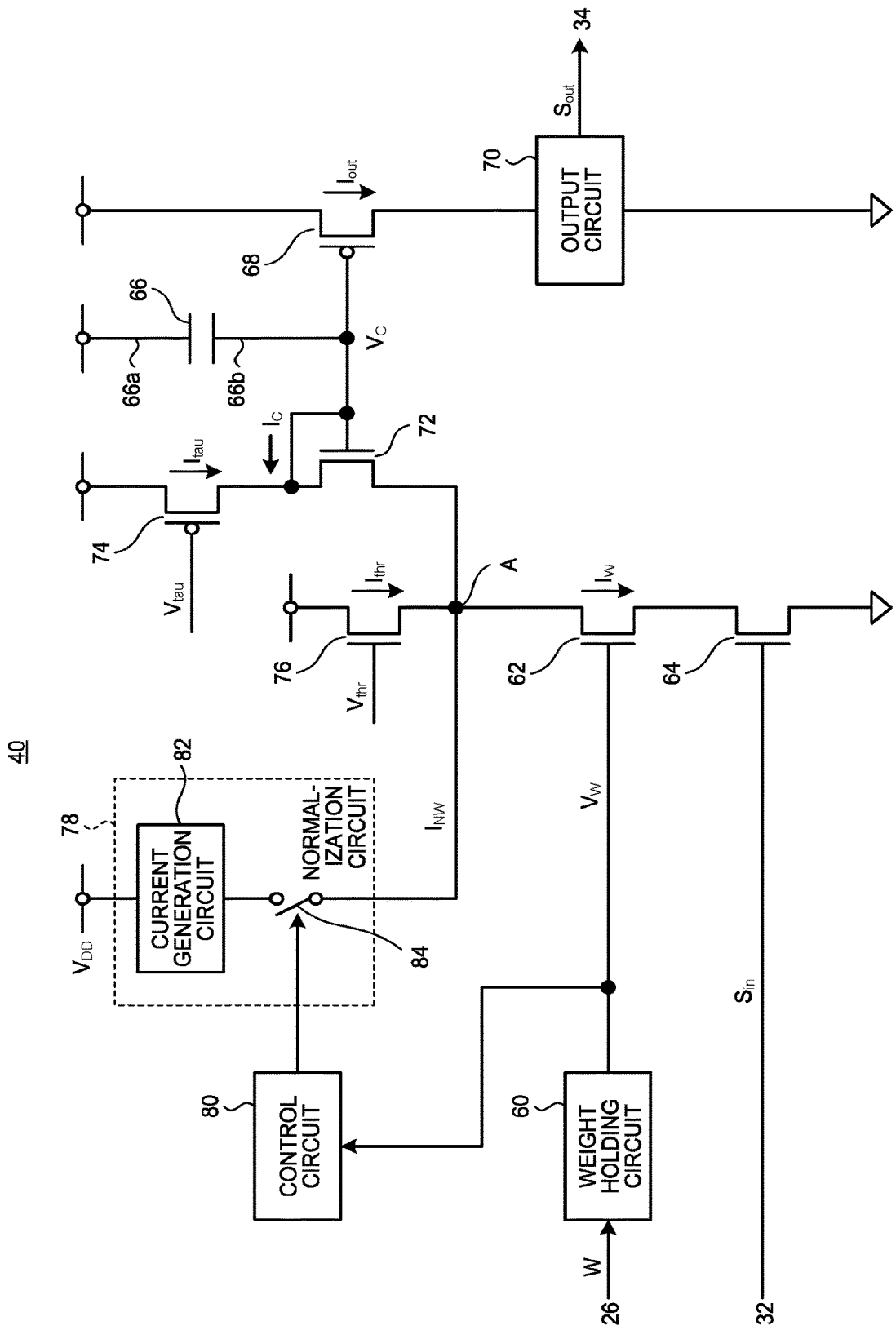
FIG. 4 is a diagram illustrating the configuration of a synaptic circuit.

FIG. 4 is a diagram illustrating the configuration of the synaptic circuit 40.

The synaptic circuit 40 includes a weight holding circuit 60, a weight current circuit 62, an input switch 64, a capacitor 66, an output amplification circuit 68, an output circuit 70, a charge adjustment circuit 72, a first constant current circuit 74, a second constant current circuit 76, a normalization circuit 78, and a control circuit 80.

The weight holding circuit 60 holds the weight value (W) set by the learning circuit 26. The weight holding circuit 60 may include, for example, a variable resistor having a resistance value that changes in accordance with the weight value (W). The weight holding circuit 60 may include, for example, a holding capacitor that accumulates charges corresponding to the weight value (W). In addition, the weight holding circuit 60 may include a memory or the like and store a digital value corresponding to the weight value (W). In the present embodiment, the weight holding circuit 60 outputs a weight voltage ($V_W$) corresponding to the held weight value (W).

The weight current circuit 62 applies a weight current ($I_W$) having a current value corresponding to the weight value (W) set in the weight holding circuit 60. For example, the weight current circuit 62 applies the weight current ($I_W$) proportional to the weight value (W).

When the input switch 64 is in the ON state, the weight current circuit 62 draws the weight current ($I_W$) from a node A and applies it to a reference potential (ground). The weight current circuit 62 does not apply the weight current ($I_W$) when the input switch 64 is in the OFF state (sets the weight current to 0).

In the present embodiment, the weight current circuit 62 is a metal oxide semiconductor field-effect transistor (MOS-FET). In the example of FIG. 4, the weight current circuit 62 is an N-channel MOS-FET.

In the weight current circuit 62, which is a MOS-FET, the weight voltage ($V_W$) is applied to its gate, and its drain is connected to the node A. Then, the weight current circuit 62 being a MOS-FET applies, between the drain-source, the weight current ($I_W$) having a current amount corresponding to the weight voltage ($V_W$).

The input switch 64 switches whether or not to cause the weight current circuit 62 to apply the weight current ($I_W$), in response to a binary input signal ($S_{in}$) having been output from the pre-synaptic neuron circuit 32. For example, the input switch 64 causes the weight current circuit 62 to apply the weight current ($I_W$) when the input signal ($S_{in}$) is 1. On the other hand, the input switch 64 causes the weight current circuit 62 not to apply the weight current ($I_W$) when the input signal ($S_{in}$) is 0 (that is, the weight current ($I_W$) is 0).

In the present embodiment, the input switch 64 is a MOS-FET that performs a switching operation. In the example of FIG. 4, the input switch 64 is an N-channel MOS-FET. In the MOS-FET input switch 64, the input signal ($S_{in}$) is applied to its gate, its drain is connected to the source of the weight current circuit 62, and its source is connected to the reference potential (ground).

Then, the MOS-FET input switch 64b is placed into the ON state when the input signal ($S_{in}$) is 1, and causes the weight current circuit 62 to apply the weight current ($I_W$) by connecting the source of the weight current circuit 62 to the ground. On the other hand, the input switch 64 being a MOS-FET becomes into the OFF state when the input signal ($S_{in}$) is 0, and causes the weight current circuit 62 not to apply the weight current ($I_W$) by disconnecting the source of the weight current circuit 62 from the ground.

The capacitor 66 includes a first terminal 66a and a second terminal 66b. The first terminal 66a of the capacitor 66 is connected to a power supply potential (e.g., VDD) at which a constant voltage is generated. In capacitor 66, a constant voltage is applied to the first terminal 66a. In addition, the capacitor 66 generates a capacitor voltage ($V_C$) at the second terminal 66b. The capacitor voltage ($V_C$) is a value obtained by subtracting a voltage generated by the capacitor 66 from the power supply potential. The voltage generated by the capacitor 66 is a voltage in which the accumulated charge amount is divided by the capacitance.

The output amplification circuit 68 switches between the ON state and the OFF state in accordance with the capacitor voltage ($V_C$) generated at the second terminal 66b of the capacitor 66. For example, the output amplification circuit 68 becomes into the ON state when the capacitor voltage ($V_C$) is equal to or less than a threshold voltage ($V_t$), and becomes into the OFF state when the capacitor voltage ($V_C$) is greater than the threshold voltage (V).

The output amplification circuit 68 is, for example, a MOS-FET that performs a switching operation. In the example of FIG. 4, the output amplification circuit 68 is a P-channel MOS-FET. In the output amplification circuit 68, which is a P-channel MOS-FET, the capacitor voltage ($V_C$) is applied to its gate, its source is connected to the power supply potential, and its drain is connected to the output circuit 70. Then, the output amplification MOS-FET circuit 68 is placed into the ON state when the capacitor voltage ($V_C$) is equal to or less than the threshold voltage ($V_t$), and supplies an output current ($I_{out}$) to the output circuit 70. On the other hand, the MOS-FET output amplification circuit 68 is placed into the OFF state when the capacitor voltage ($V_C$) is greater than the threshold voltage ($V_t$), and stops the output of the output current ($I_{out}$).

The output circuit 70 outputs an output signal ($S_{out}$) corresponding to the capacitor voltage ($V_C$) generated at the second terminal 66b of the capacitor 66. For example, the output circuit 70 outputs the binary output signal ($S_{out}$) obtained by binarizing the capacitor voltage ($V_C$) by using the threshold voltage ($V_t$).

For example, the output circuit 70 outputs the output signal ($S_{out}$) that becomes 1 when the output current ($I_{out}$) is supplied from the output amplification circuit 68 and becomes 0 when the output current ($I_{out}$) is not supplied from the output amplification circuit 68. In this case, the output circuit 70 outputs the output signal ($S_{out}$) that becomes 1 when the capacitor voltage ($V_C$) is equal to or less than the threshold voltage ($V_t$) and becomes 0 when the capacitor voltage ($V_C$) is greater than the threshold voltage ($V_t$).

It is to be noted that the output circuit 70 may output the output signal ($S_{out}$) which is a current having an analog value (continuous value). In this case, the output amplification circuit 68 does not perform a switching operation and functions as a current amplifier that applies the output current ($I_{out}$) having an analog value (continuous value) corresponding to the capacitor voltage ($V_C$). Then, the output circuit 70 outputs the output current ($I_{out}$), as it is, as the output signal ($S_{out}$). Alternatively, the output circuit 70 may output, as the output signal ($S_{out}$), a voltage signal having an analog value (continuous value) corresponding to the output current ($I_{out}$).

When the weight current ($I_W$) is applied through the input switch 64, the charge adjustment circuit 72 decreases or increases the charge accumulated in the capacitor 66 with a time change amount corresponding to the current value of the weight current ($I_W$). For example, when the input switch 64 is in the ON state, that is, when the input signal ($S_{in}$) indicates 1, the charge adjustment circuit 72 decreases or increases the charge accumulated in the capacitor 66.

In addition, when the weight current ($I_W$) is not applied through the input switch 64, the charge adjustment circuit 72 keeps the charge accumulated in the capacitor 66 constant. For example, when the input switch 64 is in the OFF state, that is, when the input signal ($S_{in}$) is 0, the charge adjustment circuit 72 does not change the charge accumulated in the capacitor 66.

The charge adjustment circuit 72 is, for example, a diode-connected MOS-FET. In the example of FIG. 4, the charge adjustment circuit 72 is a diode-connected N-channel MOS-FET. In the charge adjustment circuit 72, which is an N-channel MOS-FET, the gate and the drain are connected, the second terminal 66b of the capacitor 66 is connected to the gate, and the source is connected to the node A. Then, when the weight current ($I_W$) is applied to the node A, the MOS-FET charge adjustment circuit 72 draws a capacitor current ($I_C$) from the second terminal 66b of the capacitor 66, and supplies it to the node A. Alternatively, the MOS-FET charge adjustment circuit 72 draws the capacitor current ($I_C$) from the node A, and supplies it to the second terminal 66b of the capacitor 66.

This allows the charge adjustment circuit 72 to decrease the capacitor voltage ($V_C$) when the weight current ($I_W$) is applied through the input switch 64 and to keep the capacitor voltage ($V_C$) constant when the weight current ($I_W$) is not applied through the input switch 64. Accordingly, the charge adjustment circuit 72 can decrease the capacitor voltage ($V_C$) when the input switch 64 is in the ON state, that is, when the input signal ($S_{in}$) is 1. In addition, the charge adjustment circuit 72 can keep the capacitor voltage ($V_C$) constant when the input switch 64 is in the OFF state, that is, when the input signal ($S_{in}$) is 0.

When the weight current ($I_W$) is applied through the input switch 64, the first constant current circuit 74 supplies a predetermined constant first current ($I_{tau}$) to the node A. The first constant current circuit 74 is, for example, a MOS-FET. In the example of FIG. 4, the first constant current circuit 74 is a P-channel MOS-FET. In the first constant current circuit 74, which is a P-channel MOS-FET, a predetermined constant first voltage ($V_{tau}$) is applied to its gate, its source is connected to the power supply potential, and its drain is connected to the drain of the charge adjustment circuit 72. Then, when the weight current ($I_W$) is applied through the input switch 64, the first constant current circuit 74 supplies the first current ($I_{tau}$) to the node A via the charge adjustment circuit 72.

When the weight current ($I_W$) is applied through the input switch 64, the second constant current circuit 76 supplies a predetermined constant second current ($I_{thr}$) to the node A. The second constant current circuit 76 is, for example, a MOS-FET. In the example of FIG. 4, the second constant current circuit 76 is an N-channel MOS-FET. In the second constant current circuit 76, which is an N-channel MOS-FET, a predetermined constant second voltage ($V_{thr}$) is applied to its gate, its drain is connected to the power supply potential, and its source is connected to the node A. Then, when the weight current ($I_W$) is applied through the input switch 64, the second constant current circuit 76 supplies the second current ($I_{thr}$) to the node A via the charge adjustment circuit 72.

The normalization circuit 78 outputs a normalization current ($I_{NW}$) having a preset current value to the node A in response to a control by the control circuit 80. The normalization circuit 78 includes a current generation circuit 82 and a switch circuit 84. The current generation circuit 82 generates the normalization current ($I_{NW}$) having a preset current value. The switch circuit 84 switches whether or not to supply, to the node A, the normalization current ($I_{NW}$) generated from the current generation circuit 82 in response to the control by the control circuit 80.

The control circuit 80 switches whether or not to subtract the normalization current ($I_{NW}$) from the capacitor current ($I_C$) in accordance with the weight value (W). More specifically, the control circuit 80 switches whether or not to output the normalization current ($I_{NW}$) from the normalization circuit 78 to the node A in accordance with the weight value (W). For example, the control circuit 80 causes the normalization circuit 78 not to output the normalization current ($I_{NW}$) to the node A when the weight value (W) is equal to or less than a set value, and causes the normalization circuit 78 to output the normalization current ($I_{NW}$) to the node A when the weight value (W) is greater than the set value.

For example, when the weight voltage ($V_W$) is within a preset first voltage range (e.g., when the weight voltage ($V_W$) is equal to or less than a preset first voltage value), the control circuit 80 causes the normalization circuit 78 not to output the normalization current ($I_{NW}$) to the node A. Then, the control circuit 80 causes the normalization circuit 78 to output the normalization current ($I_{NW}$) to the node A when the weight voltage ($V_W$) deviates from the first voltage range (e.g., when the weight voltage ($V_W$) becomes greater than the first voltage value).

After starting the output of the normalization current ($I_{NW}$), even when the weight voltage ($V_W$) falls into the first voltage range (for example, even when the weight voltage ($V_W$) becomes equal to or less than the first voltage value), the control circuit 80 continues to output the normalization current ($I_{NW}$). Alternatively, after starting the output of the normalization current ($I_{NW}$), the control circuit 80 may stop outputting the normalization current ($I_{NW}$) when the weight voltage ($V_W$) is kept within the first voltage range (for example, when the weight voltage ($V_W$) is equal to or less than the first voltage value) during a period from a predetermined time ago to the present.

Figure 5:
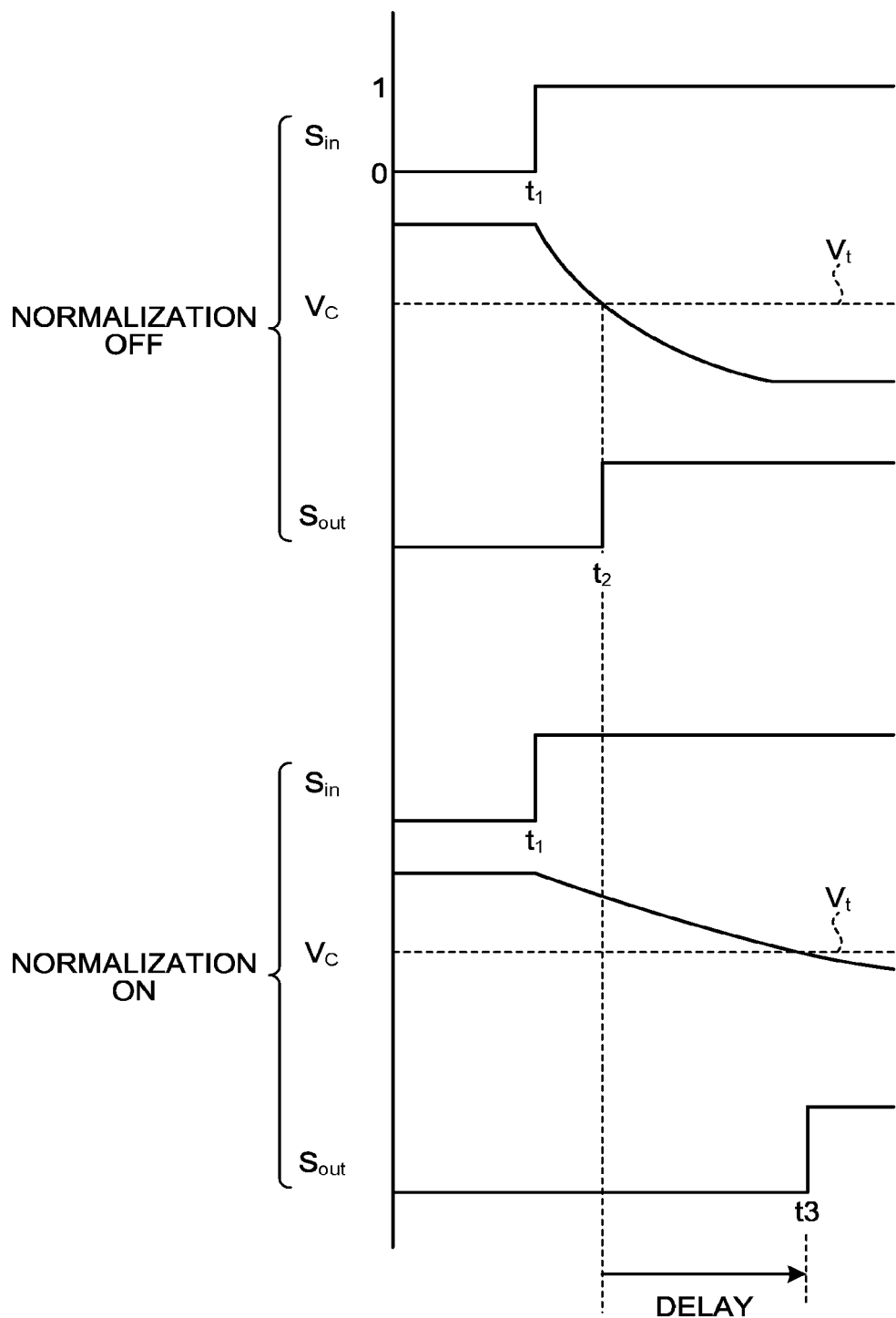
FIG. 5 is a diagram illustrating an example of an input signal, a capacitor voltage, and an output signal.

FIG. 5 is a diagram illustrating an example of the input signal ($S_{in}$), the capacitor voltage ($V_C$), and the output signal ($S_{out}$).

In the circuit illustrated in FIG. 4, the capacitor voltage ($V_C$) starts to decrease from a first time ($t_1$) at which the input signal ($S_{in}$) changes from 0 to 1. Then, the output signal ($S_{out}$) changes from 0 to 1 at a time when the capacitor voltage ($V_C$) becomes equal to or less than the threshold voltage ($V_t$).

The time change amount of the capacitor voltage ($V_C$) changes in accordance with the magnitude of the weight current ($I_W$). The weight current ($I_W$) is a current amount corresponding to the weight value (W) held by the weight holding circuit 60.

Accordingly, the output signal ($S_{out}$) changes from 0 to 1 at the time delayed by the time corresponding to the weight value (W) from the first time ($t_1$) at which the input signal ($S_{in}$) changed from 0 to 1. The larger the weight value (W) is, the shorter the delay time from a time when the input signal ($S_{in}$) changed from 0 to 1 to a time when the output signal ($S_{out}$) changes from 0 to 1 is, for example. Therefore, the synaptic circuit 40 is able to generate the output signal ($S_{out}$) in which the input signal ($S_{in}$) received from the pre-synaptic neuron circuit 32 is delayed by a time corresponding to the weight value (W), and supply the generated output signal ($S_{out}$) to the post-synaptic neuron circuit 34.

Furthermore, the time change amount of the capacitor voltage ($V_C$) also changes between the state where the normalization current ($I_{NW}$) is not output (normalization OFF) and the state where the normalization current ($I_{NW}$) is output (normalization ON). More specifically, the time change amount of the capacitor voltage ($V_C$) in the state where the normalization current ($I_{NW}$) is output (normalization ON) is greater than the time change amount of the capacitor voltage ($V_C$) in the state where the normalization current ($I_{NW}$) is not output (normalization OFF).

Thus, the delay time when the normalization current ($I_{NW}$) is output (normalization ON) is longer than the delay time when the normalization current ($I_{NW}$) is not output (normalization OFF). That is, as illustrated in FIG. 5, a third time ($t_3$) at which the output signal ($S_{out}$) changes from 0 to 1 in the state of "normalization ON" is on is later than a second time ($t_2$) at which the output signal ($S_{out}$) changes from 0 to 1 in the state of "normalization OFF".

Accordingly, when the normalization current ($I_{NW}$) is output, the control circuit 80 can output the output signal ($S_{out}$) similar to that when the weight value (W) is decreased by a constant value. That is, the control circuit 80 can execute the processing similar to that when the normalization processing is performed.

The difference between the case where the normalization current ($I_{NW}$) is not output and the case where the normalization current ($I_{NW}$) is output will be further described below.

When the weight current ($I_W$) is applied through the input switch 64 (that is, when the input switch 64 is in the ON state), the synaptic circuit 40 draws the weight current ($I_W$) from the node A to the reference potential (ground). Furthermore, when the weight current ($I_W$) is applied through the input switch 64 and the normalization current ($I_{NW}$) is not output (normalization OFF), the synaptic circuit 40 supplies the first current ($I_{tau}$), the second current ($I_{thr}$), and the capacitor current ($I_C$) from the power supply potential side to the node A. Accordingly, in this case, the current at the node A is expressed as represented by Equation (11).

$$I_W = I_{tau} + I_{thr} + I_C \quad (11)$$

From Equation (11), the capacitor current ($I_C$) is expressed as represented by Equation (12) when the weight current ($I_W$) is applied through the input switch 64 and the normalization current ($I_{NW}$) is not output.

$$I_C = I_W - (I_{tau} + I_{thr}) \quad (12)$$

That is, when the weight current ($I_W$) is applied through the input switch 64 and the normalization current ($I_{NW}$) is not output, the capacitor current ($I_C$) becomes a current value obtained by subtracting a constant current having a preset current value from the weight current ($I_W$).

On the other hand, when the weight current ($I_W$) is applied through the input switch 64 (input switch 64 is in the ON state) and the normalization current ($I_{NW}$) is output (normalization ON), the synaptic circuit 40 supplies the first current ($I_{tau}$), the second current ($I_{thr}$), the capacitor current ($I_C$), and the normalization current ($I_{NW}$) from the power supply potential side to the node A. Accordingly, in this case, the current at the node A is expressed as represented by Equation (13).

$$I_W = I_{tau} + I_{thr} + I_C + I_{NW} \quad (13)$$

From Equation (13), the capacitor current ($I_C$) is expressed as represented by Equation (14) when the weight current ($I_W$) is applied through the input switch 64 and the normalization current ($I_{NW}$) is output.

$$I_C = I_W - I_{NW} - (I_{tau} + I_{thr}) \quad (14)$$

That is, when the weight current ($I_W$) is applied through the input switch 64 and the normalization current ($I_{NW}$) is output, the capacitor current ($I_C$) is a current value obtained by subtracting a constant current having a preset current value and the normalization current from the weight current ($I_W$).

Equations (12) and (14) represent that the capacitor current ($I_C$ during normalization OFF) when the normalization current ($I_{NW}$) is not output and the capacitor current ($I_C$ during normalization ON) when the normalization current ($I_{NW}$) is output have a relationship as in Inequality (15).

$$I_C \text{ during normalization} OFF > I_C \text{ during normalization} ON \quad (15)$$

Thus, the control circuit 80 can increase the current amount supplied from the power supply potential side to the node A by outputting the normalization current ($I_{NW}$) to the node A. When the current amount supplied from the power supply potential side to the node A increases, the capacitor current ($I_C$) becomes relatively small. Accordingly, by switching from the state in which the normalization current ($I_{NW}$) has not been output (normalization OFF) to the state in which the normalization current ($I_{NW}$) has been output (normalization ON), the control circuit 80 can reduce the time change amount of the charges accumulated in the capacitor 66. That is, by switching from the state in which the normalization current ($I_{NW}$) has not been output (normalization OFF) to the state in which the normalization current ($I_{NW}$) has been output (normalization ON), the control circuit 80 can reduce the time change amount of the capacitor voltage ($V_C$).

Figure 6:
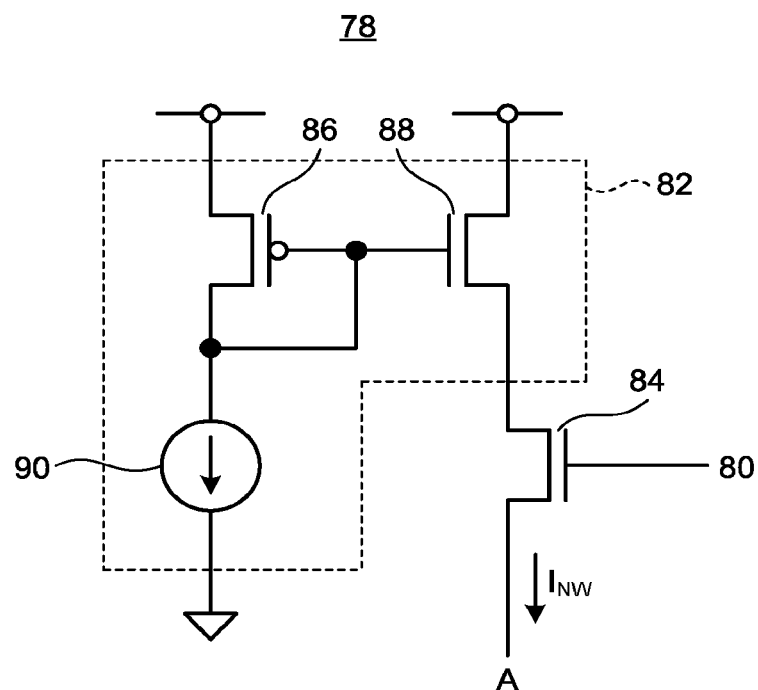
FIG. 6 is a diagram illustrating a first circuit configuration example of a normalization circuit.

FIG. 6 is a diagram illustrating the first circuit configuration example of the normalization circuit 78. The normalization circuit 78 is a circuit as illustrated in FIG. 6, for example.

The current generation circuit 82 of the normalization circuit 78 illustrated in FIG. 6 includes a first field-effect transistor 86, a second field-effect transistor 88, and a constant current source 90.

The first field-effect transistor 86 is diode-connected, and its gate is connected to the gate of the second field-effect transistor 88. In the example of FIG. 6, the first field-effect transistor 86 is a P-channel MOS-FET. In this case, the source of the first field-effect transistor 86 is connected to the power supply potential, and the gate thereof is connected to the drain.

The second field-effect transistor 88 applies, between the drain and the source, a current corresponding to the current flowing between the drain and the source of the first field-effect transistor 86. In the example of FIG. 6, the second field-effect transistor 88 is an N-channel MOS-FET. In this case, the gate of the second field-effect transistor 88 is connected to the gate of the first field-effect transistor 86, the drain thereof is connected to the power supply potential, and the source thereof is connected to the switch circuit 84.

The constant current source 90 is connected in series with respect to the drain-source of the first field-effect transistor 86. The constant current source 90 applies a constant current. In the example of FIG. 6, the constant current source 90 is connected between the drain of the first field-effect transistor 86 and the reference potential (ground).

In addition, the switch circuit 84 of the normalization circuit 78 illustrated in FIG. 6 outputs the current output from the source of the second field-effect transistor 88 to the node A as the normalization current ($I_{NW}$). In the example of FIG. 6, the switch circuit 84 is an N-channel MOS-FET. In this case, the control signal from the control circuit 80 is applied to the gate of the switch circuit 84, the drain thereof is connected to the source of the second field-effect transistor 88, and the source thereof is connected to the node A. The control circuit 80 gives a control signal to the switch circuit 84 to switch the switch circuit 84 to a conductive state or a disconnected state.

The normalization circuit 78 having such a configuration can supply, in response to the control signal from the control circuit 80, a current corresponding to the constant current output from the constant current source 90 to the node A as the normalization current ($I_{NW}$).

Figure 7:
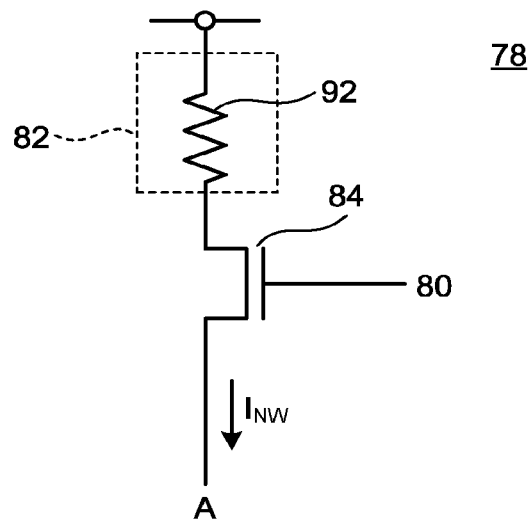
FIG. 7 is a diagram illustrating a second circuit configuration example of the normalization circuit.

FIG. 7 is a diagram illustrating the second circuit configuration example of the normalization circuit 78. The normalization circuit 78 may be a circuit as illustrated in FIG. 7, for example.

The current generation circuit 82 of the normalization circuit 78 illustrated in FIG. 7 includes a resistor 92. The resistor 92 has one terminal connected to the power supply potential and the other terminal connected to the switch circuit 84.

In addition, the switch circuit 84 of the normalization circuit 78 illustrated in FIG. 7 outputs the current flowing through the resistor 92 as the normalization current ($I_{NW}$). In the example of FIG. 7, the switch circuit 84 is an N-channel MOS-FET. In this case, the control signal from the control circuit 80 is applied to the gate of the switch circuit 84, the drain thereof is connected to the resistor 92, and the source thereof is connected to the node A. The control circuit 80 gives a control signal to the switch circuit 84 to switch the switch circuit 84 to a conductive state or a disconnected state.

The normalization circuit 78 having such a configuration can supply a current flowing through the resistor 92 to the node A as the normalization current ($I_{NW}$) in response to the control signal from the control circuit 80.

Figure 8:
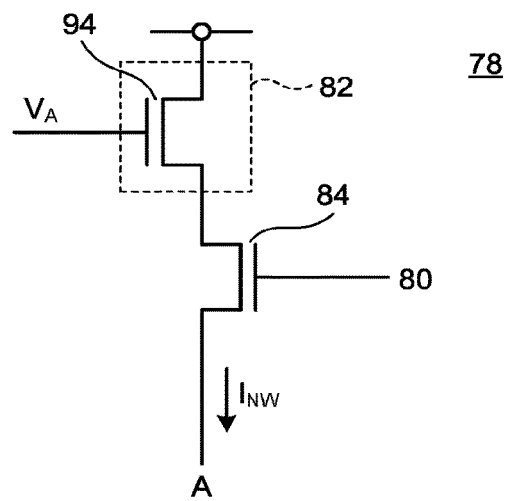
FIG. 8 is a diagram illustrating a third circuit configuration example of the normalization circuit.

FIG. 8 is a diagram illustrating the third circuit configuration example of the normalization circuit 78. The normalization circuit 78 may be a circuit as illustrated in FIG. 8, for example.

The current generation circuit 82 of the normalization circuit 78 illustrated in FIG. 8 includes a third field-effect transistor 94. The third field-effect transistor 94 applies a constant current between the drain and the source. In the example illustrated in FIG. 8, the third field-effect transistor 94 is an N-channel MOS-FET. In this case, a predetermined constant voltage (VA) is applied to the gate of the third field-effect transistor 94, the drain thereof is connected to the power supply potential, and the source thereof is connected to the switch circuit 84.

In addition, the switch circuit 84 of the normalization circuit 78 illustrated in FIG. 8 outputs the current flowing between the drain and the source of the third field-effect transistor 94 as the normalization current ($I_{NW}$). In the example of FIG. 8, the switch circuit 84 is an N-channel MOS-FET. In this case, the control signal from the control circuit 80 is applied to the gate of the switch circuit 84, the drain thereof is connected to the source of the third field-effect transistor 94, and the source thereof is connected to the node A. The control circuit 80 gives a control signal to the switch circuit 84 to switch the switch circuit 84 to a conductive state or a disconnected state.

The normalization circuit 78 having such a configuration can supply a current flowing between the drain and the source of the third field-effect transistor 94 to the node A as the normalization current ($I_{NW}$) in response to the control signal from the control circuit 80.

Figure 9:
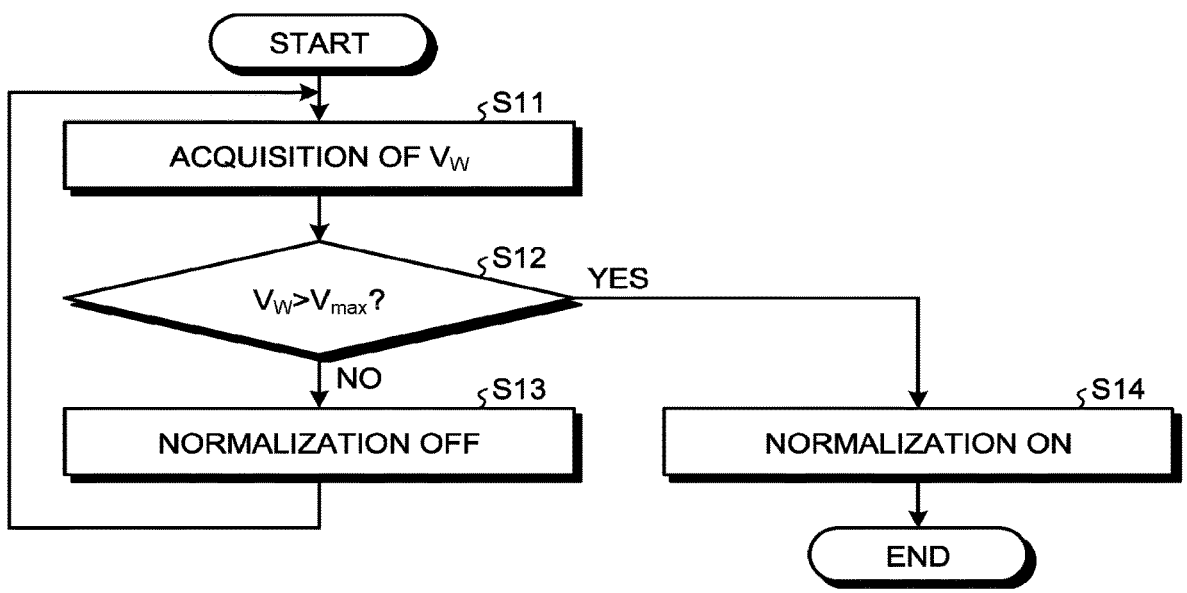
FIG. 9 is a diagram illustrating a first processing example of a control circuit.

FIG. 9 is a diagram illustrating the first processing example of the control circuit 80. The control circuit 80 executes processing in the flow illustrated in FIG. 9, for example.

First, in S11, the control circuit 80 acquires the weight voltage ($V_W$) output from the weight holding circuit 60. Subsequently, in S12, the control circuit 80 determines whether or not the weight voltage ($V_W$) is greater than a predetermined voltage ($V_{max}$). When the weight voltage ($V_W$) is not greater than the predetermined voltage ($V_{max}$) (No in S12), the control circuit 80 advances the processing to S13.

In S13, the control circuit 80 gives the normalization circuit 78 a control signal that turns off the normalization. When the control signal that turns off the normalization is received, the normalization circuit 78 does not output the normalization current ($I_{NW}$). After S13, the control circuit 80 returns the processing to S11.

On the other hand, when the weight voltage ($V_W$) is greater than the predetermined voltage ($V_{max}$) (Yes in S12), the control circuit 80 advances the processing to S14. In S14, the control circuit 80 gives the normalization circuit 78 a control signal that turns on the normalization. When the control signal that turns on the normalization is received, the normalization circuit 78 outputs the normalization current ($I_{NW}$).

When the normalization current ($I_{NW}$) has been output, the time change amount of the capacitor voltage ($V_C$) becomes smaller than that when the normalization current ($I_{NW}$) is not output. As a result, the synaptic circuit 40 can increase the delay time from a time when the input signal ($S_{in}$) changes from 0 to 1 to a time when the output signal ($S_{out}$) changes from 0 to 1. This allows the synaptic circuit 40 to output the output signal ($S_{out}$) similar to that when the weight value (W) is reduced by a constant value. That is, the synaptic circuit 40 can execute the processing similar to that when the normalization processing is performed on the weight value (W).

After outputting the control signal that turns on the normalization, the control circuit 80 ends the present flow. That is, after outputting the normalization current ($I_{NW}$), the control circuit 80 continues to output the normalization current ($I_{NW}$).

By executing the above processing, the control circuit 80 is capable of causing the normalization circuit 78 not to output the normalization current ($I_{NW}$) when the weight voltage ($V_W$) is within the preset first voltage range (for example, when the weight voltage ($V_W$) is not greater than the predetermined voltage ($V_{max}$)). In addition, the control circuit 80 is capable of causing the normalization circuit 78 to output the normalization current ($I_{NW}$) when the weight voltage ($V_W$) deviates from the first voltage range (for example, when the weight voltage ($V_W$) becomes greater than the predetermined voltage ($V_{max}$)). Furthermore, after starting the output of the normalization current ($I_{NW}$), even when the weight voltage ($V_W$) falls into the first voltage range (for example, even when the weight voltage ($V_W$) becomes equal to or less than the predetermined voltage ($V_{max}$)), the control circuit 80 is able to cause the normalization circuit 78 to continue to output the normalization current ($I_{NW}$).

Figure 10:
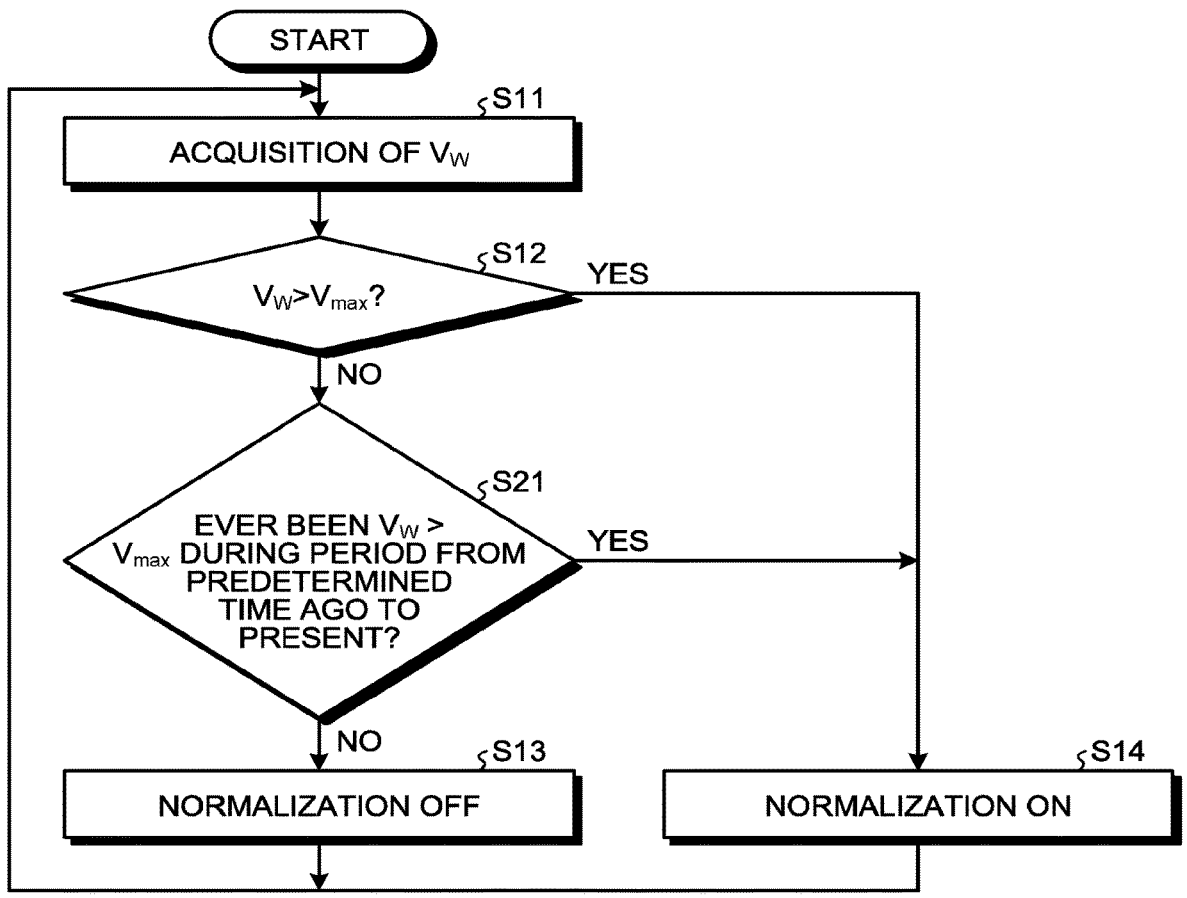
FIG. 10 is a diagram illustrating a second processing example of the control circuit.

FIG. 10 is a diagram illustrating the second processing example of the control circuit 80. The control circuit 80 may execute the processing in the flow illustrated in FIG. 10, for example.

In the processing illustrated in FIG. 10, the processing of S21 is added in comparison with the foregoing processing illustrated in FIG. 9. When the weight voltage ($V_W$) is not greater than the predetermined voltage ($V_{max}$) (No in S12), the control circuit 80 advances the processing to S21 instead of S13.

In S21, the control circuit 80 determines whether or not the weight voltage ($V_W$) has exceeded the predetermined voltage ($V_{max}$) during a period from a predetermined time ago to the present. When the weight voltage ($V_W$) has never exceeded the predetermined voltage ($V_{max}$) during the period from the predetermined time ago to the present (No in S21), the control circuit 80 advances the processing to S13.

Then, in S13, the control circuit 80 gives the normalization circuit 78 a control signal that turns off the normalization. When the control signal that turns off the normalization is received, the normalization circuit 78 does not output the normalization current ($I_{NW}$). After S13, the control circuit 80 returns the processing to S11.

On the other hand, when the weight voltage ($V_W$) is greater than the predetermined voltage ($V_{max}$) (Yes in S12), or when the weight voltage ($V_W$) has exceeded the predetermined voltage ($V_{max}$) during the period from the predetermined time ago to the present (Yes in S21), the control circuit 80 advances the processing to S14.

In S14, the control circuit 80 gives the normalization circuit 78 a control signal that turns on the normalization. Then, after S14, the control circuit 80 returns the processing to S11.

By executing the above processing, the control circuit 80 is capable of causing the normalization circuit 78 to output the normalization current ($I_{NW}$) when the weight voltage ($V_W$) deviates from the first voltage range (for example, when the weight voltage ($V_W$) becomes greater than the predetermined voltage ($V_{max}$)). In addition, after starting the output of the normalization current ($I_{NW}$), the control circuit 80 is capable of causing the normalization circuit 78 to stop the output of the normalization current ($I_{NW}$) when the weight voltage ($V_W$) is kept within the first voltage range during a period from a predetermined time ago to the present.

Figure 11:
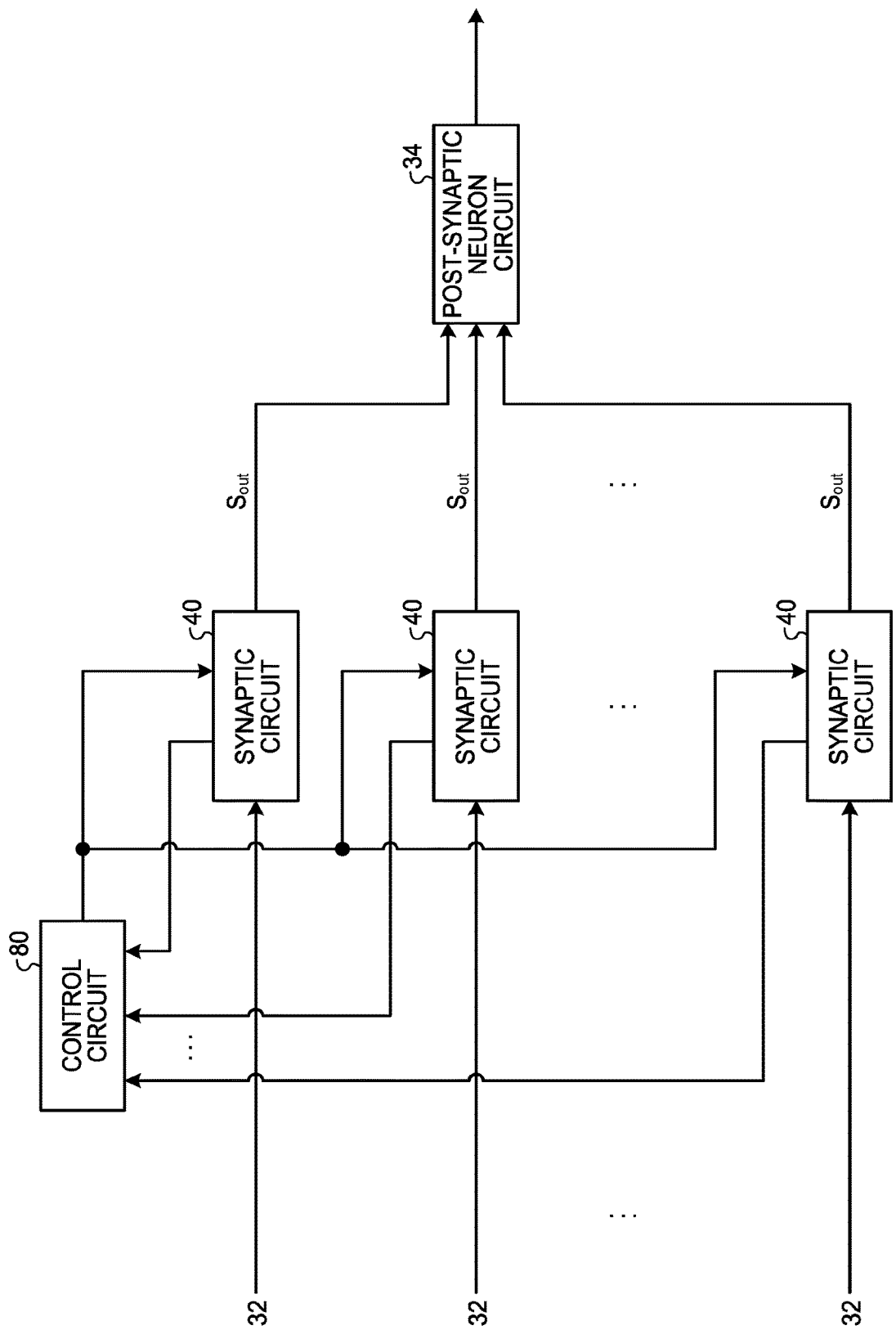
FIG. 11 is a diagram illustrating a connection relation among a plurality of synaptic circuits according to a variation.

FIG. 11 is a diagram illustrating the connection relation among the plurality of synaptic circuits 40 and the post-synaptic neuron circuit 34 according to the variation. The neural network apparatus 10 may include control circuit 80 in common for the plurality of synaptic circuits 40, instead of the control circuit 80 in each of the plurality of synaptic circuits 40.

The control circuit 80 may commonly control two or more of the synaptic circuits that output the output signal ($S_{out}$) to the identical post-synaptic neuron circuit 34. In this case, the control circuit 80 acquires the weight value (W) held in the weight holding circuit 60 of each of the two or more synaptic circuits 40. Then, the control circuit 80 switches whether or not to reduce the normalization current ($I_{NW}$) from the capacitor current ($I_C$) of each of the two or more synaptic circuits 40, in accordance with the two or more weight values (W) having been acquired.

For example, when all of the weight voltages ($V_W$) in the two or more synaptic circuits 40, which output the output signal to the identical post-synaptic neuron circuit 34, are within the first voltage range, the control circuit 80 causes all the normalization circuits 78 in the two or more synaptic circuits 40 not to output the normalization current ($I_{NW}$). When at least one weight voltage ($V_W$) in the two or more synaptic circuits 40 that output the output signal to the identical post-synaptic neuron circuit 34 deviates from the first voltage range, the control circuit 80 causes from all of the normalization circuits 78 in the two or more synaptic circuits to output the normalization current ($I_{NW}$).

Figure 12:
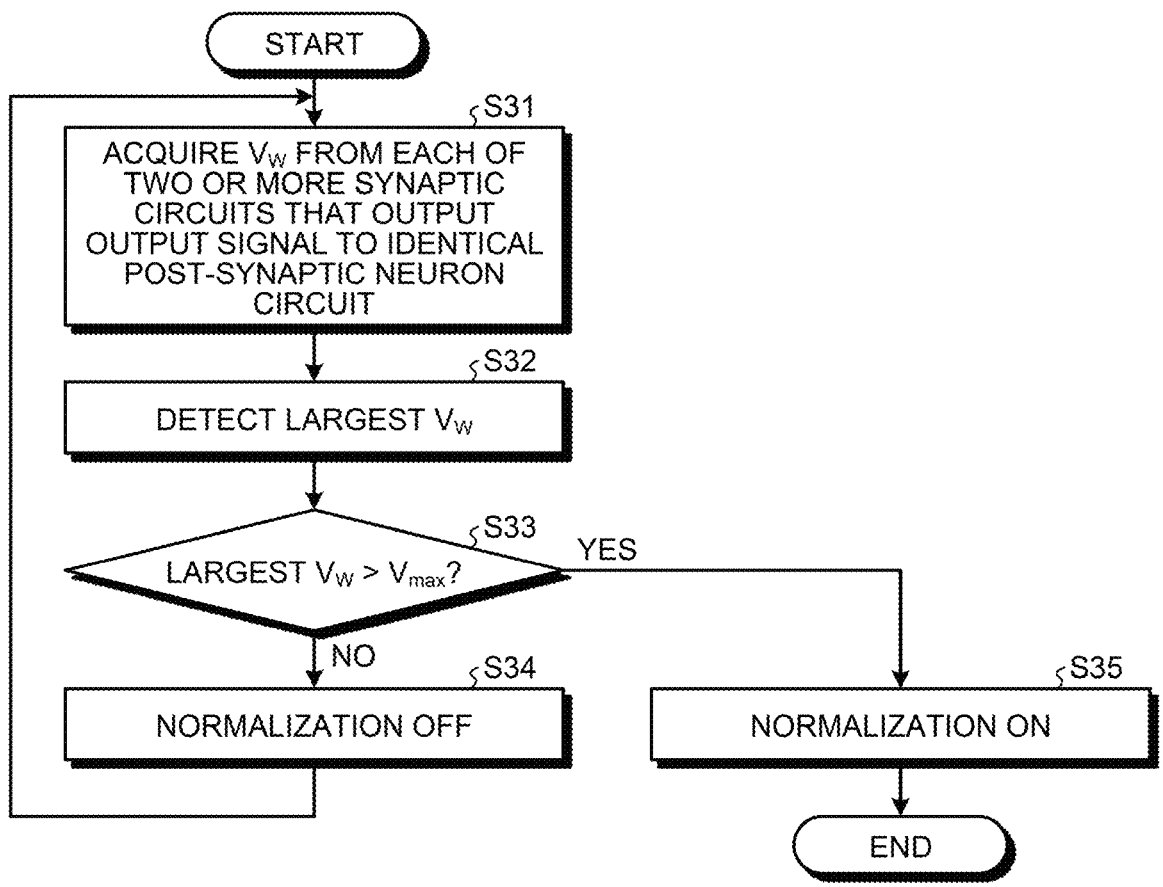
FIG. 12 is a diagram illustrating a first processing example of a control circuit according to the variation.

FIG. 12 is a diagram illustrating the first processing example of the control circuit 80. The control circuit 80 executes processing on the two or more synaptic circuits 40 connected to the identical post-synaptic neuron circuit 34 in the flow illustrated in FIG. 12. First, in S31, the control circuit 80 acquires the weight voltage ($V_W$) from each of the two or more synaptic circuits 40. Subsequently, in S32, the control circuit 80 detects the largest weight voltage ($V_W$) of the two or more weight voltages ($V_W$).

Subsequently, in S33, the control circuit 80 determines whether or not the largest weight voltage ($V_W$) is greater than the predetermined voltage ($V_{max}$). When the largest weight voltage ($V_W$) is not greater than the predetermined voltage ($V_{max}$) (No in S33), the control circuit 80 advances the processing to S34.

In S34, the control circuit 80 gives a control signal, which turns off the normalization, to the normalization circuit 78 of each of the two or more synaptic circuits 40. When the control signal that turns off the normalization is received, the normalization circuit 78 of each of the two or more synaptic circuits 40 does not output the normalization current ($I_{NW}$). After S34, the control circuit 80 returns the processing to S31.

On the other hand, when the largest weight voltage ($V_W$) is greater than the predetermined voltage ($V_{max}$) (Yes in S33), the control circuit 80 advances the processing to S35. In S35, the control circuit 80 gives the control signal that turns on the normalization to the normalization circuit 78 of each of the two or more synaptic circuits 40. When the control signal that turns on the normalization is received, the normalization circuit 78 of each of the two or more synaptic circuits 40 outputs the normalization current ($I_{NW}$).

When the normalization current ($I_{NW}$) has been output, the time change amount of the capacitor voltage ($V_C$) becomes smaller than that when the normalization current ($I_{NW}$) is not output. As a result, the synaptic circuit 40 can increase the delay time from a time when the input signal ($S_{in}$) changes from 0 to 1 to a time when the output signal ($S_{out}$) changes from 0 to 1. This allows the synaptic circuit 40 to output the output signal ($S_{out}$) similar to that when the weight value (W) is reduced by a constant value. That is, the synaptic circuit 40 can execute the processing similar to that when the normalization processing is performed on the weight value (W).

After outputting the control signal that turns on the normalization, the control circuit 80 ends the present flow. That is, after outputting the normalization current ($I_{NW}$), the control circuit 80 continues to output the normalization current ($I_{NW}$).

When all the weight voltages ($V_W$) in the two or more synaptic circuits 40, which output the output signal to the identical post-synaptic neuron circuit 34, are within the first voltage range, the control circuit 80 is capable of causing each of the normalization circuits 78 in the two or more synaptic circuits 40 not to output the normalization current ($I_{NW}$). In addition, when at least one weight voltage ($V_W$) in the two or more synaptic circuits 40 that output the output signal to the identical post-synaptic neuron circuit 34 deviates from the first voltage range, the control circuit 80 is capable of causing each of the normalization circuits 78 in the two or more synaptic circuits 40 to output the normalization current ($I_{NW}$). Furthermore, after starting the output of the normalization current ($I_{NW}$), even when all of the weight voltages ($V_W$) in the two or more synaptic circuits 40 falls fall into the first voltage range, the control circuit 80 is capable of causing the normalization circuit 78 of each of the two or more synaptic circuits 40 to continue to output the normalization current ($I_{NW}$).

Figure 13:
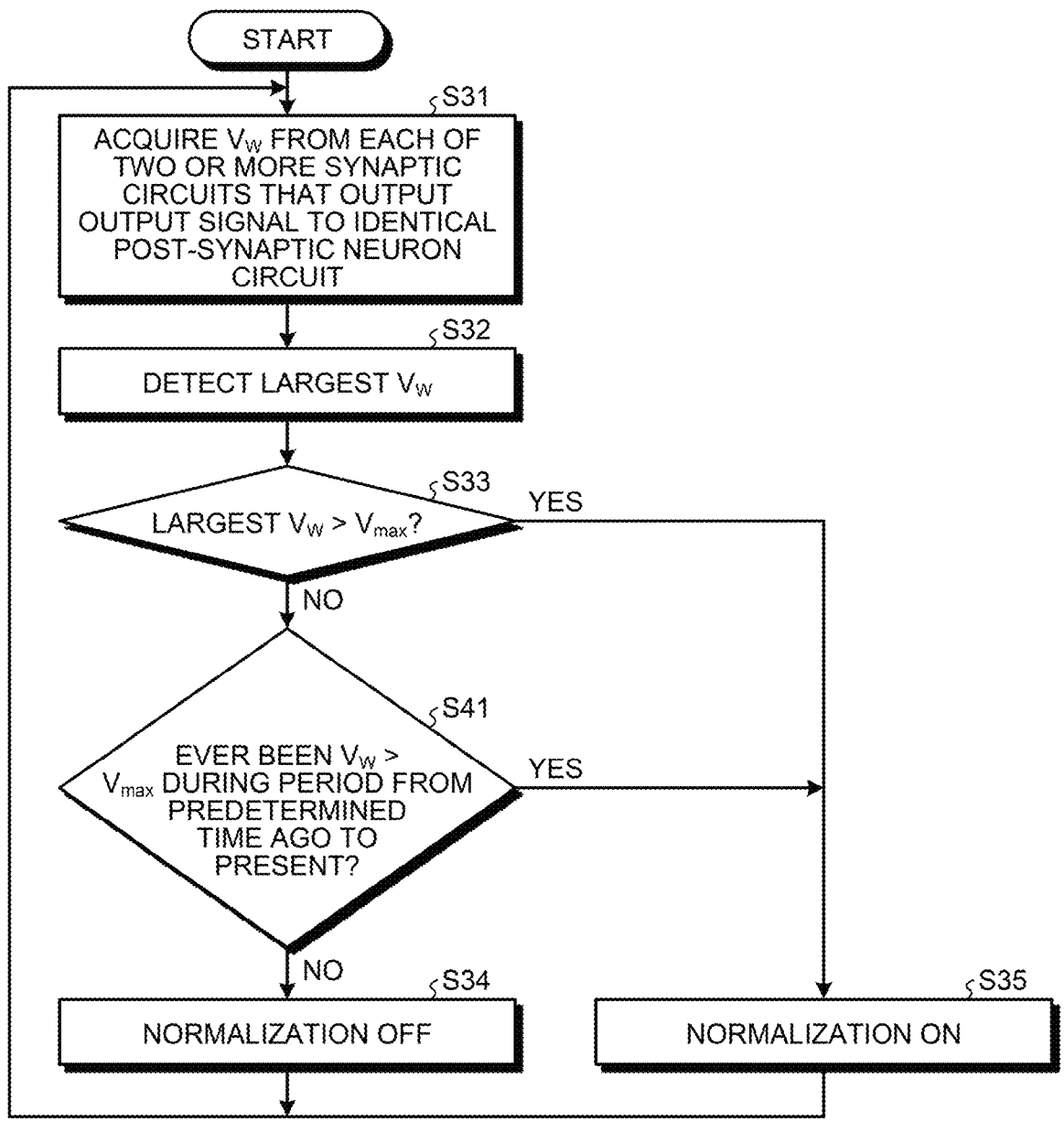
FIG. 13 is a diagram illustrating a second processing example of the control circuit according to the variation.

FIG. 13 is a diagram illustrating the second processing example of the control circuit 80. The control circuit 80 may execute the processing on the two or more synaptic circuits 40 connected to the identical post-synaptic neuron circuit 34 in the flow illustrated in FIG. 13.

In the processing illustrated in FIG. 13, the processing of S41 is added in comparison with the processing illustrated in FIG. 12. When the largest weight voltage ($V_W$) is not greater than the predetermined voltage ($V_{max}$) (No in S33), the control circuit 80 advances the processing to S41 instead of S34.

In S41, the control circuit 80 determines whether or not the largest weight voltage ($V_W$) has exceeded the predetermined voltage ($V_{max}$) during a period from a predetermined time ago to the present. When the largest weight voltage ($V_W$) has never exceeded the predetermined voltage ($V_{max}$) during the period from the predetermined time ago to the present (No in S41), the control circuit 80 advances the processing to S34.

Then, in S34, the control circuit 80 gives the control signal that turns off the normalization to the normalization circuit 78 of each of the two or more synaptic circuits 40. When the control signal that turns off the normalization is received, the normalization circuit 78 does not output the normalization current ($I_{NW}$). After S34, the control circuit 80 returns the processing to S31.

On the other hand, when the largest weight voltage ($V_W$) is greater than the predetermined voltage ($V_{max}$) (Yes in S33), or when the largest weight voltage ($V_W$) has exceeded the predetermined voltage ($V_{max}$) during the period from the predetermined time ago to the present (Yes in S41), the control circuit 80 advances the processing to S35.

In S35, the control circuit 80 gives the control signal that turns on the normalization to the normalization circuit 78 of each of the two or more synaptic circuits 40. Then, after S35, the control circuit 80 returns the processing to S31.

By executing the above processing, the control circuit 80 is capable of causing the normalization circuit 78 of each of the two or more synaptic circuits 40 to output the normalization current ($I_{NW}$) when the largest weight voltage ($V_W$) deviates from the first voltage range. In addition, after starting the output of the normalization current ($I_{NW}$), the control circuit 80 is capable of causing the normalization circuit 78 to stop the output of the normalization current ($I_{NW}$) when all of the weight voltages ($V_W$) in the two or more synaptic circuits 40 are kept within the first voltage range during a period from a predetermined time ago to the present.

As described above, the neural network apparatus 10 according to the present embodiment is capable of performing, with a simple configuration, normalization processing of adjusting firing of a neuron to enable an appropriate inference. Thus, the neural network apparatus 10 according to the present embodiment can execute accurate inference.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synaptic circuit in which a weight value is set, the synaptic circuit receiving a binary input signal from a pre-synaptic neuron circuit and outputting an output signal to a post-synaptic neuron circuit, the synaptic circuit comprising:
    a weight current circuit that applies a weight current having a current value corresponding to the weight value;
    an input switch that performs switching, in response to the input signal, between causing and not causing the weight current circuit to apply the weight current;
    a capacitor that includes a first terminal and a second terminal, the first terminal being given a constant voltage;
    an output circuit that outputs the output signal corresponding to a capacitor voltage generated at the second terminal;
    a charge adjustment circuit that, when the weight current is applied through the input switch, decreases or increases charges accumulated in the capacitor by
        drawing, from the second terminal, a capacitor current corresponding to a current value of the weight current, or
        supplying the capacitor current to the second terminal;
    a normalization circuit that outputs a normalization current having a predetermined current value; and
    a control circuit that performs switching between reducing and not reducing the normalization current from the capacitor current in accordance with the weight value.

2. The circuit according to claim 1, wherein
the control circuit performs switching, in accordance with the weight value, between causing and not causing the normalization circuit to output the normalization current, and
the capacitor current has
a current value obtained by subtracting a preset constant current from the weight current when the weight current is applied through the input switch and the normalization current is not output, and
a current value obtained by subtracting the constant current and the normalization current from the weight current when the weight current is applied through the input switch and the normalization current is output.

3. The circuit according to claim 2, wherein
the normalization circuit includes:
    a first field-effect transistor that is diode-connected;
    a second field-effect transistor whose gate is connected to a gate of the first field-effect transistor;
    a constant current source that is connected in series to a drain-source of the first field-effect transistor, the constant current source applying a predetermined in-normalization-circuit constant current; and
    a switch circuit connected in series to a drain-source of the second field-effect transistor,
the normalization circuit outputs a current flowing between the drain-source of the second field-effect transistor as the normalization current, and
the control circuit switches the switch circuit to a conductive state or a disconnected state.

4. The circuit according to claim 2, wherein
the normalization circuit includes:
    a resistor containing a first resistance terminal that is connected to a power supply potential and containing a second resistance terminal; and
    a switch circuit connected between the second resistance terminal and the weight current circuit,
the normalization circuit outputs a current flowing through the resistor as the normalization current, and
the control circuit switches the switch circuit to a conductive state or a disconnected state.

5. The circuit according to claim 2, wherein
the normalization circuit includes:
    a third field-effect transistor whose gate is given a predetermined voltage; and a switch circuit connected in series to a drain-source of the third field-effect transistor, the normalization circuit outputs, as the normalization current, a current flowing between the drain-source of the third field-effect transistor, and the control circuit switches the switch circuit to a conductive state or a disconnected state.

6. The circuit according to claim 2, further comprising a weight holding circuit that stores the weight value and outputs a weight voltage having a voltage value corresponding to the weight value, wherein the weight current circuit applies the weight current having a current value corresponding to the weight voltage.

7. The circuit according to claim 6, wherein the control circuit causes the normalization circuit not to output the normalization current when the weight voltage is within a preset first voltage range, and causes the normalization circuit to output the normalization current when the weight voltage deviates from the first voltage range.

8. The circuit according to claim 7, wherein the control circuit causes the normalization circuit, after starting the output of the normalization current, to continue to output the normalization current even when the weight voltage falls into the first voltage range.

9. The circuit according to claim 7, wherein the control circuit causes the normalization circuit, after starting the output of the normalization current, to stop outputting the normalization current when the weight voltage is kept within the first voltage range during a period from a predetermined time ago to present.

10. A neural network apparatus comprising:

N layers (N is an integer equal to or greater than 2) each including a plurality of neuron circuits; and (N−1) synapses, wherein each of the (N−1) synapses includes a plurality of synaptic circuits in each of which a unique weight value is set, and a control circuit, each of the plurality of synaptic circuits included in an n-th synapse (n is an integer equal to or greater than 1 and equal to or less than (N−1)) of the (N−1) synapses:

receives, as a binary input signal, a signal having been output from one pre-synaptic neuron circuit of the plurality of neuron circuits included in an n-th layer of the N layers; and gives an output signal to one post-synaptic neuron circuit of the plurality of neuron circuits included in an (n+1)-th layer of the N layers, each of the plurality of neuron circuits included in the (n+1)-th layer of the N layers:

receives two or more of the output signals having been output from two or more synaptic circuits included in the n-th synapse; and outputs a signal that fires on a basis of the received two or more of the output signals, each of the plurality of synaptic circuits includes:

a weight current circuit that applies a weight current having a current value corresponding to the weight value;

an input switch that performs switching, in response to the input signal, between causing and not causing the weight current circuit to apply the weight current;

a capacitor that includes a first terminal and a second terminal, the first terminal being given a constant voltage;

an output circuit that outputs the output signal corresponding to a capacitor voltage generated at the second terminal; and a charge adjustment circuit that, when the weight current is applied through the input switch, decreases or increases charges accumulated in the capacitor by drawing, from the second terminal, a capacitor current corresponding to a current value of the weight current, or supplying the capacitor current to the second terminal, and a normalization circuit that outputs a normalization current having a predetermined current value; and the control circuit performs switching, for each of the plurality of synaptic circuits, between reducing and not reducing the normalization current from the capacitor current in accordance with the weight value.

11. The apparatus according to claim 10, wherein the control circuit performs switching, in accordance with the weight value and for each of the plurality of synaptic circuits, between causing and not causing the normalization circuit to output the normalization current, and the capacitor current has a current value obtained by subtracting a preset constant current from the weight current when the weight current is applied through the input switch and the normalization current is not output, and a current value obtained by subtracting the constant current and the normalization current from the weight current when the weight current is applied through the input switch and the normalization current is output.

12. The apparatus according to claim 11, wherein each of the plurality of synaptic circuits further includes a weight holding circuit that stores the weight value and outputs a weight voltage having a voltage value corresponding to the weight value, and the weight current circuit applies, for each of the plurality of synaptic circuits, the weight current having a current value corresponding to the weight voltage.

13. The apparatus according to claim 12, wherein, for each of the plurality of synaptic circuits, the control circuit causes the normalization circuit not to output the normalization current when the weight voltage is within a preset first voltage range, and causes the normalization circuit to output the normalization current when the weight voltage deviates from the first voltage range.

14. The apparatus according to claim 13, wherein the control circuit causes the normalization circuit not to output the normalization current when all the weight voltages in two or more synaptic circuits, which output the output signal to an identical post-synaptic neuron circuit, are within the first voltage range, and causes the normalization circuit to output the normalization current when at least one of the weight voltages in the two or more synaptic circuits deviates from the first voltage range.

15. The apparatus according to claim 10, further comprising a learning circuit that increases, by a predetermined amount, the weight value having been set in the plurality of synaptic circuits included in each of the (N−1) synapses when a signal having been output from the post-synaptic neuron circuit fires in response to firing of a signal having been output from the pre-synaptic neuron circuit.

\* \* \* \* \*